Dec. 22, 1942.    H. C. IRVIN    2,305,701
SLIPPER BEARING
Filed Sept. 29, 1941    2 Sheets—Sheet 1

Inventor:
Harry C. Irvin
By Wallace & Cannon
Attorneys

Dec. 22, 1942.  H. C. IRVIN  2,305,701
SLIPPER BEARING
Filed Sept. 29, 1941   2 Sheets-Sheet 2
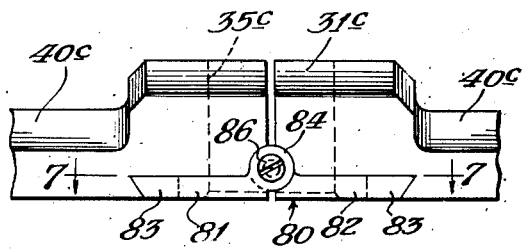
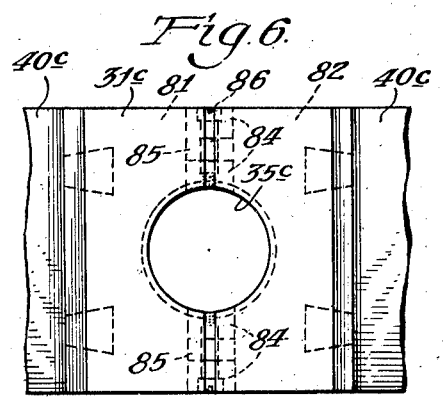
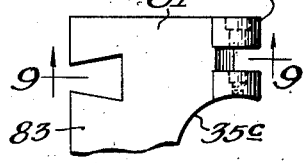
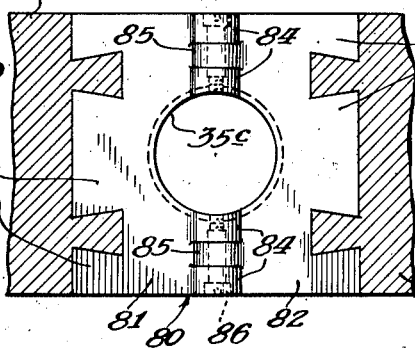
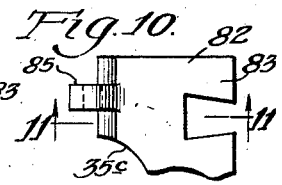
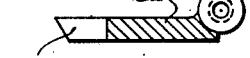
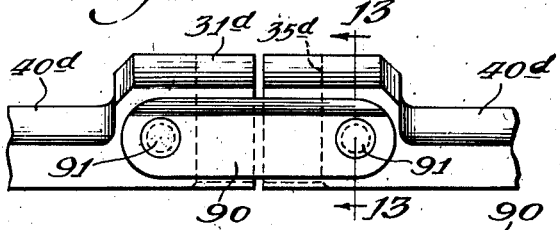
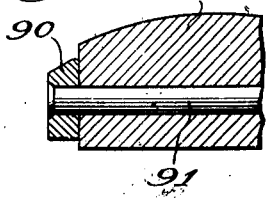
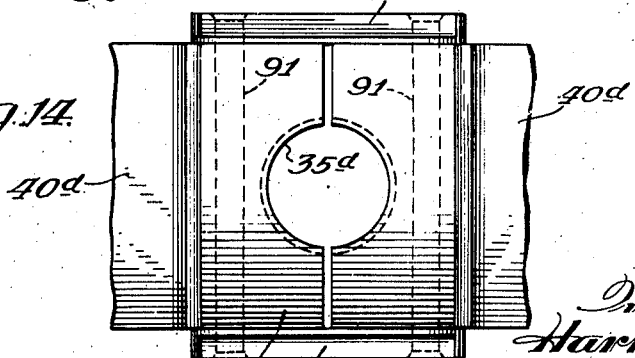
Inventor:
Harry C. Irvin
By Wallace and Cannon
Attorneys Patented Dec. 22, 1942

2,305,701

UNITED STATES PATENT OFFICE 2,305,701

SLIPPER BEARING

Harry C. Irvin, Detroit, Mich., assignor to The American Brake Shoe and Foundry Company, Wilmington, Del., a corporation of Delaware Application September 29, 1941, Serial No. 412,739

7 Claims. (Cl. 64—7)

This invention relates to bearings and particularly to slipper bearings for universal couplings and the like.

In the transmission of mechanical power between, for example, operable parts of machinery there are many instances in which torque is imparted from a driving shaft to a driven shaft that is arranged in end to end relation with the driving shaft and this is frequently done in circumstances in which the shafts are not at all times axially aligned one with the other. In such instances it is necessary to interconnect the shafts by universal couplings or the like to enable the driving connection between the shafts to be maintained despite an angular relation therebetween. In a conventional form of universal coupling that has been used in such instances cooperating male and female members are respectively formed on or secured to the adjacent ends of the shafts, the male member consisting of a flat tongue or fishtail which is inserted into a bifurcation afforded in a female member. The branches of the bifurcated female member are arcuately recessed transversely thereof and such recesses are located so as to be so associated with the aforesaid tongue when it is inserted into the bifurcation as to define a pair of opposed semi-cylindrical pockets located on opposite sides of the tongue. A slipper bearing is disposed in each of the aforesaid pockets or recesses and such bearing has a convex surface that conforms to the configuration of the recess and also a flat face that conforms to an adjacent face of the aforesaid tongue and such slipper bearings are maintained in spaced relation by a bearing pin which passes through a suitable opening in the tongue. In instances where the shafts are rotated under circumstances where they are not in axial alignment, the angular relation of the tongue and female member changes constantly whereupon the slipper bearings rock within the recesses in the female member and the tongue pivots about the bearing pin whereby pivotal movement about angularly related axes is afforded.

It has been observed in the operation of universal couplings of the aforesaid character that the major portion of the wear attendant to operation of the coupling occurs at the end portions of the slipper bearings and the parts of the female member with which such end portions cooperate and where the female portions are so worn and it becomes necessary to replace one slipper bearing with another, there will be instances where, until the new slipper bearing wears down so as to conform to the worn portions of the female member, the slipper bearing will be subjected to appreciable stresses and strains.

In couplings of this character means is provided for preventing or limiting endwise displacement of the slipper bearings with relation to the female portions of the coupling, and this is ordinarily attained through the provision of an arcuate recess in the female portions of the coupling adapted to be engaged by a projecting boss portion on each slipper bearing. Such engagement is effected between the edges of the boss and the sides of the arcuate recess, thereby to limit endwise displacement of the slipper bearings with relation to the female portions of the coupling.

As hereinbefore pointed out, the major portion of the wear in a coupling of the character to which the present invention pertains takes place adjacent to the ends of the female portions of the coupling, and when the coupling is used to transmit rotative driving force the torque is so applied to the slipper bearings that one end portion of each slipper bearing is pressed into firm contact with the opposed female portion of the coupling. In the event that the coupling is worn the end portions of the slipper bearing tend to assume a form which is complemental to the worn form of the bearing. This results in undesired and objectionable stresses in the end portions which are thus effective in the driving operation. These stresses tend to cause transverse breakage of the slipper bearings adjacent to the juncture of the stressed end portions on the boss portion.

The primary object of the present invention is to enable slipper bearings to be so constructed that the application of driving force thereto results merely in readjustment of the slipper bearings without the application of stresses thereto which might tend to cause breakage of the slipper bearings.

Another object of the invention is to afford flexibility in slipper bearings, and a more specific object related to the foregoing is to construct slipper bearings in two pieces each comprising an end section and one-half of the boss section, and to pivotally connect the two pieces of the slipper bearing together so as to form a unitary structure embodying flexibility which adapts the slipper bearing for use with worn coupling members.

Other and further objects of the present invention will be apparent from the following description and claims and will be understood by reference to the accompanying drawings which, by way of illustration, show preferred embodiments and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings,

Fig. 5 is a fragmental front elevational view of a two-piece slipper bearing embodying the features of the invention;

Fig. 6 is a fragmental plan view of the slipper bearing shown in Fig. 5;

Fig. 7 is a fragmental plan section taken along the line 7—7 in Fig. 5;

Figs. 8 to 11 inclusive, are detail views of the hinge elements illustrated in Fig. 7;

Fig. 12 is a fragmental front elevational view illustrating another type of two-piece slipper bearing embodying the features of the invention;

Fig. 13 is a fragmental cross-sectional view taken substantially along the line 13—13 of Fig. 12; and Fig. 14 is a fragmental plan view of the slipper bearing shown in Fig. 12.

Figure 1:
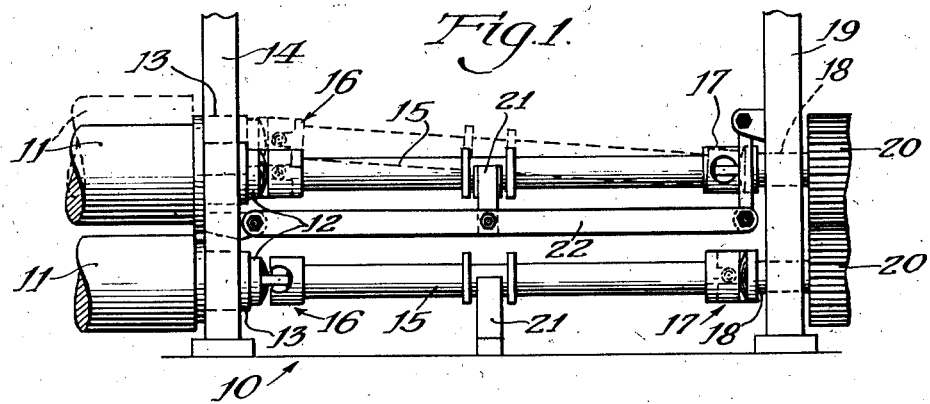
Fig. 1 is a fragmental elevational view of a portion of a rolling mill.

Slipper bearings of the character to which the present invention relates are commonly employed in the drives for rolling mills and the like, such as the mill 10 fragmentally illustrated in Fig. 1. The rolling mill 10 comprises a pair of opposed rolls 11 having reduced end portions or pintles 12 journaled in bearings 13 carried by frame members as 14, and these pintles 12 are connected by universal couplings 16 to the ends of spindles 15. The other ends of the spindles 15 are connected by universal couplings 17 to stub shafts 18 journaled in a frame member 19, gearing 20 being carried by the stub shafts 18 for connecting these shafts to the driving means (not shown). To afford adjustability of the rolls 11 in accordance with the thickness of the material that is to be worked upon, the bearings as 13 are arranged to be vertically positioned at selected points in the frame members as 14. Thus the upper roll 11 may be adjusted from the full-line position thereof, Fig. 1, to the broken-line position thereof in this view to accommodate a greater thickness of material, thus causing the upper spindle 15 to assume the position indicated by broken lines so that this spindle 15 is angularly disposed with respect to the associated pintle 12 and stub shaft 18. The lower spindle 15 is supported at its middle by a thrust or spindle carrier bearing 21 which is supported in any suitable manner. The upper spindle 15 is carried by a spindle carrier bearing 21 which is mounted on a linkage 22 attached to the bearing 13 of the upper roll 11, and as the position of the upper spindle 15 is changed in the manner just described the bearing 21 is correspondingly repositioned so that it may continue to support this spindle.

Figure 2:
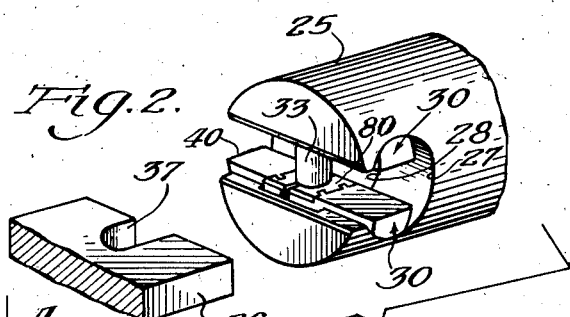
Fig. 2 is a fragmental perspective view of a universal coupling in partially disassembled condition, showing the manner in which a preferred form of my novel slipper bearing structure is embodied in the coupling.

The universal couplings 16 and 17 which interconnect the spindles 15 with the rolls 11 and stub shafts 18 afford driving connections between these various rotatable members even though they are not longitudinally aligned with each other. As shown in detail in Fig. 2, each universal coupling comprises a female member 25 which is formed on or secured to an end of a spindle as 15, Fig. 1, and a male member 26 which is provided on the adjacent end of an associated stub shaft as 18 or a pintle as 12. The male member 26 is in the form of a flat tongue that may be inserted into a bifurcation in the female member 25. Arcuate or cylindrical recesses 27, Figs. 2 and 4, are formed in the branches of the bifurcation in the female member 25 and extend transversely to the free edges thereof, and deeper recesses 28 concentric with the recesses 27 are afforded in the member 25 between the free ends of the semi-cylindrical openings defined by the recesses 27.

Figures 3, 4:
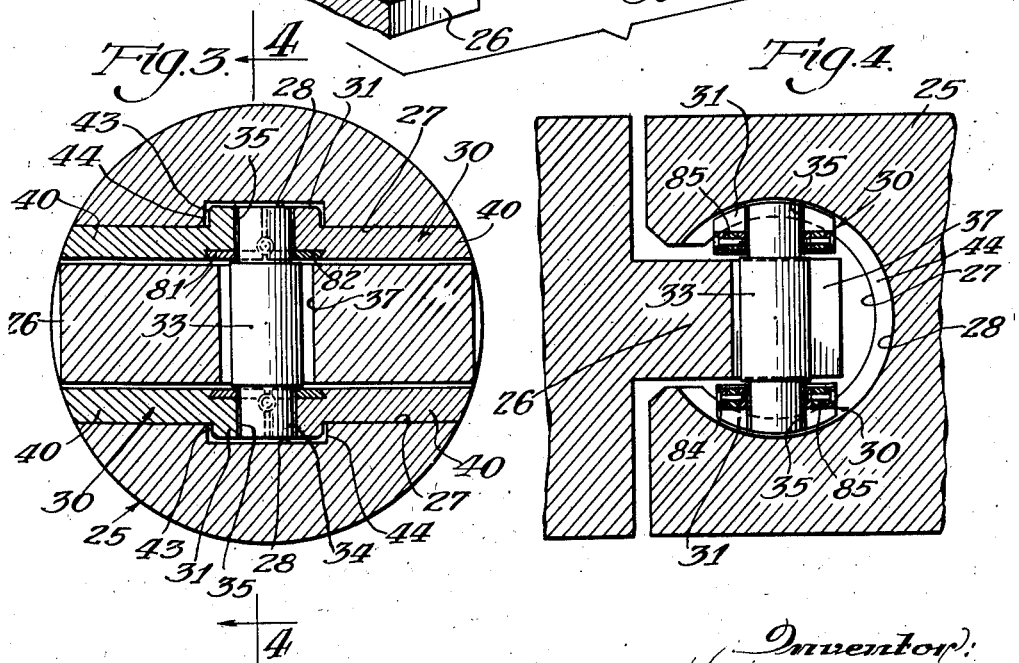
Fig. 3 is a cross-sectional view of the aforesaid universal coupling.
Fig. 4 is a longitudinal sectional view of the coupling taken on the line 4—4 on Fig. 3.

A pair of slipper bearings 30 are respectively interposed between the tongue 26 and the arcuate recesses in the branches of the bifurcation in the female member 25, as shown in Fig. 3, each such slipper bearing 30 having flat and convex surfaces to conform respectively with the tongue 26 and the semi-cylindrical recesses in the female member 25. The medial or boss portion 31 of each slipper bearing 30 is of greater thickness than the end sections 40 of the bearing, and these bosses 31 seat in the deeper recesses 28 while the end sections 40 are received by the recesses 27. The bosses 31 of the slipper bearings 30 are interconnected and maintained in spaced relation with each other by a bearing pin 33 having reduced end portions 34 which are received in socket openings as 35, Fig. 4, in these bosses, the pin 33 passing through a suitable slot or other opening 37 in the tongue 26.

Where the shafts which are interconnected by a universal coupling 16 or 17 are not axially aligned, as is the case when the upper spindle is in the broken-line position thereof shown in Fig. 1, the slipper bearings 30 are rocked back and forth in their recesses 27 and 28, Figs. 3 and 4, as the angular position of the tongue 26 with respect to the female member 25 changes in the course of rotation of these parts. However, longitudinal movement of the slipper bearings 30 is prevented by the end faces 43 of the bosses 31 which may engage with the shoulders 44, Fig. 4, intermediate the recesses 27 and 28 in the female member. Thus, the tongue 26 may pivot about two axes, one being afforded by the bearing pin 33 and the other by the cylindrical axis of the recesses 27 and 28 in which the slipper bearings are seated.

As is indicated in somewhat exaggerated fashion in Fig. 3, the rotative force or reaction exerted by the tongue 26 upon each slipper bearing 30 is borne substantially entirely by only one of the end sections 40 of such bearing in instances where the direction of rotation remains substantially constant. These heavily stressed end sections 40 of the slipper bearings 30 and the cooperating portions of the female member 25 undergo a relatively rapid rate of wear, and as the support for such end sections becomes weakened due to changes in the configuration of the mating surfaces there is a tendency for these end sections to bend relative to the bosses 31 of the slipper bearings, the bosses 31 being maintained separated by the shoulders of the bearing pin 33. As stated hereinabove, it is a purpose of the present invention to enable such bending movement of the more heavily stressed end sections 40 to take place without unduly straining the slipper bearing assembly.

In accordance with the present invention the end sections and the boss of each slipper bearing are so formed and related to each other as to render the end sections capable of pivotal adjusting movement as an incident to the application of the driving force between the two members of the coupling, the slipper bearings being constructed and arranged in such a manner that the arcuate bearing surfaces of the two end sections which are under compression in a particular driving operating may, without the creation of breaking stress in the bearings, be shifted by the impressed load so as to conform substantially with the worn arcuate bearing surface of the female member of the coupling. This end is attained, in that embodiment of the invention which is shown in Figs. 5 to 11 inclusive, through forming the boss of each slipper bearing in two sections 31c separated on the transverse center line of the pin-receiving opening 35c, and by forming each end section 40c of the bearing integral with the adjacent section 31c of the boss. The sections 31c of the boss are pivotally interconnected so as to form a unitary bearing in which the two sections or parts are capable of relative shifting or pivotal movement, and in the form shown in Figs. 5 to 11 inclusive of the drawings, such pivotal interconnection is attained by means of a single butt hinge 80, the pivotal axis of which is located in substantially the plane of separation of the two boss sections 31c. When the bearings are molded from a composition material, or resin impregnated fabric or the like, the hinge 80 may be secured in place as an incident to the molding of the parts. The hinge 80 has two leaves 81 and 82 which are molded into corresponding pieces of the slipper bearing flush with the two flat faces thereof. The embedded portions of the leaves 81 and 82 are provided with tapered dovetail projections 83 to anchor them securely to the slipper bearing sections. The leaves 81 and 82 have interfitting knuckles 84 and 85 respectively and the medial portions of the opposite edges of these leaves are arcuately recessed so as to define a central opening therein corresponding with the bearing pin opening 35c. The leaf 82 has two knuckles 85, one at each side of the opening 35c, and each knuckle 85 is adapted to be fitted between a pair of knuckles 84 on the leaf 81. The pivot screws 86 are employed to join the leaves 81 and 82, each screw 86 being freely passed through one of the outer knuckles 84 and the adjacent knuckle 85 and being threaded into a tapped opening in a knuckle 84 adjoining the opening 35c.

As shown in Figs. 5 and 6 the circular opening 35c extends through the body of the boss as well as the leaves of the hinge 80 so as to afford a socket for the reception of the reduced end of a bearing pin such as the bearing pin 33, Fig. 3. A slight clearance is afforded between the two sections of the slipper bearing when they are pivotally connected together by the hinge 80 to thereby enable the more heavily stressed end section 40c to adjust itself to the configuration of the cooperating bearing surface in the female member. Likewise it is necessary that there be a slight amount of clearance between the sections of the boss 31c within the opening 35c and the reduced end of the bearing pin which is embraced within the opening 35c. In addition to the clearances which are thus afforded it is also advisable to so construct the boss sections 31c that when the arcuate bearing surfaces of the end sections are engaged with the opposing arcuate bearing surfaces 27 of the female member of the coupling, the arcuate surface of the boss section 31c is spaced from the bottom of the arcuate groove 28. This renders a particular size of slipper bearing useable in a coupling where the wear has resulted in substantial reduction of the depth of the arcuate groove or recess 28. Additionally the boss sections 31c are so constructed as to afford a slight clearance between the edge surfaces 43 thereof and the edge surfaces 44 of the arcuate groove 28. Having provided clearances as described, the pivotally connected pieces of the present slipper bearing may shift when load is applied to the coupling so as to afford maximum bearing contact of the sections which are transmitting the load between the members of the coupling. In the course of such shifting movement the leaves 81 and 82 of the hinge 80 act as protecting plates which prevent injury to or wearing of the material about the ends of the openings 35c by the shoulders of the pin 33.

A modified form of two-piece slipper bearing is shown in Figs. 12 to 14 of the drawings, and in this form of the invention each slipper bearing is made in two pieces medially divided along the central transverse plane of the boss section 31d and having the end sections 40d formed integrally with the adjacent boss sections 31d. In this embodiment of the invention a different form of hinge connection is provided between the two pieces of the slipper bearing, this hinge connection being arranged to provide a greater degree of flexibility than the form shown in Figs. 5 to 11. To this end the two pieces of the slipper bearing are linked together by straps 90 which are disposed along and adjacent to the side faces of the boss 31d so that pivot pins 91 may be passed through the ends of the straps 90 and the two sections of the boss 31d to afford centers about which the two pieces of each slipper bearing may pivot to thereby conform with the worn surfaces of the female portion of the coupling. This construction has the advantage that pivot centers 91 are located near the end sections 40d thereby enabling the more heavily stressed end section 40d to adjust itself within the female member of the bearing with comparatively little strain upon the slipper bearing at the juncture of this end section with the boss 31d.

It has been pointed out hereinabove that some play must be allowed between the reduced end section of the bearing pin and the central opening in the boss of each slipper, and as herein shown this play is afforded by providing clearance between these parts. If desired the requisite play between these parts may be afforded through the use of a resilient bushing between the pin and the opening in the slipper bearing, in a manner somewhat similar to the construction employed in the copending application of Thomas J. Healy, Ser. No. 412,752, filed September 29, 1941.

It will be apparent from the foregoing description that I have provided a useful and practical slipper bearing structure which is so arranged that when the more heavily stressed end section of a slipper bearing is engaged by the male tongue of the universal coupling in the course of transmitting torque between the male and female members, such end section may yield until it receives the support of the cooperating female bearing surface without placing any undue strain upon the bearing structure as a whole. Therefore, slipper bearings constructed in accordance with my invention may be employed in existing universal couplings without necessitating any redesigning or reshaping of the male and female members thereof. As shown in the drawings, there are a number of different ways in which I contemplate constructing my novel form of slipper bearings, each embodiment having its particular features which have been pointed out hereinabove.

It will also be evident that the slipper bearings of the present invention may be utilized with great economy since the one section of each bearing which receives the least wear may be salvaged after a worn bearing has been removed from a coupling. Such worn bearings may be taken apart by removal of the pivot means, and the least worn sections thereof may be used in assembling of different or additional slipper bearings.

Thus, while I have illustrated and described selected embodiments of my invention, it is to be understood that these are capable of variation and modification and I therefore do not wish to be limited to the precise details set forth but desire to avail myself of such changes and alterations as fall within the purview of the following claims.

I claim:

1. A slipper bearing formed in two parts each comprising a half-boss section and an end section formed integrally therewith, said half-boss sections having semi-circular grooves formed in their end faces adapted to cooperate in forming a substantially cylindrical opening when the two parts of a bearing are placed in opposed relation with the end sections extending in opposite directions from their half-boss sections, said half-boss sections cooperating to form a complete boss for the slipper bearing, and means pivotally connecting the two parts of the bearing together.

2. A slipper bearing formed in two parts each comprising a half-boss section and an end section formed integrally therewith, said half-boss sections being adapted to form a complete boss for the bearing and said half-boss sections having semi-circular grooves formed in their end faces adapted to cooperate in forming a substantially cylindrical opening when the two parts of a bearing are placed in opposed relation with the end sections extending in opposite directions from their half-boss sections, and means pivotally connecting the two parts of said bearing together along at least one axis substantially perpendicular to the axis of said opening.

3. A slipper bearing formed in two parts each comprising a half-boss section and an end section formed integrally therewith, said half-boss sections cooperating to form a complete boss for the bearing and said half-boss sections having semi-circular grooves formed in their end faces adapted to cooperate in forming a substantially cylindrical opening when the two pieces of a bearing are placed in opposed relation with the end sections extending in opposite directions from their half-boss sections, and means pivotally connecting the two parts of such bearing together on a pivotal axis substantially perpendicular to and substantially intersecting the axis of said opening.

4. A slipper bearing of the character described including a medial boss portion and two end sections disposed at opposite sides of said boss and extending therefrom, said bearing comprising two separate pieces each embodying an end section and one-half of said boss, a hinge having two leaves respectively secured to said pieces and carrying interfitting knuckles adjacent the opposed faces of the separate halves of said boss, and a hinge pin received by the interfitted knuckles for thereby pivotally interconnecting the two pieces of said bearing.

5. A slipper bearing of the character described including a medial boss portion and two end sections disposed at opposite sides of said boss and extending therefrom, said bearing comprising two separate pieces each embodying an end section and one-half of said boss, a pair of straps disposed adjacent opposite faces of said boss and bridging the two halves thereof, and a pair of pivot pins respectively passed through said half-bosses and joining the corresponding ends of said straps to thereby pivotally interconnect the two pieces of said bearing.

6. A slipper bearing section for use as an element of a multi-element slipper bearing for use in a universal coupling and comprising a substantially rectangular body having side and end edges and oppositely disposed bearing faces, one of said bearing faces being substantially flat and extended to said side and end edges, said body having a half-boss portion extending from the other bearing face at one end of said body, and said other bearing face being arcuate transversely of said side edges and being extended from said half-boss portion to the other end edge of said body, said one end of said body having a substantially semi-circular groove formed therein and extending substantially perpendicular to said flat bearing face to cooperate in use with a similar groove in a similar slipper bearing section to form a socket for reception of the end of a bearing pin, and a hinge element carried by said body adjacent to said one end and forming a hinge axis extending transversely of the body by which the slipper bearing section may be pivotally secured to another slipper bearing section.

7. A slipper bearing section for use as an element of a multi-element slipper bearing for use in a universal coupling and comprising a substantially rectangular body having side and end edges and oppositely disposed bearing faces, one of said bearing faces being substantially flat and extended to said side and end edges, said body having a half-boss portion extending from the other bearing face at one end of said body, and said other bearing face being arcuate transversely of said side edges and being extended from said half-boss portion to the other end edge of said body, said one end of said body having a substantially semi-circular groove formed therein and extending substantially perpendicular to said flat bearing face to cooperate in use with a similar groove in a similar slipper bearing section to form a socket for reception of the end of a bearing pin, said body having an opening formed therethrough substantially parallel to said flat surface and substantially perpendicular to the axis upon which said arcuate face is centered, said opening being disposed adjacent to said one end but spaced from the bottom of said groove, and said opening providing a mounting for pivotal connecting means whereby similar slipper bearing sections may be connected to form a complete slipper bearing.

HARRY C. IRVIN.